United States Patent [19]

Searle

[11] Patent Number: 4,800,390

[45] Date of Patent: Jan. 24, 1989

[54] ADAPTIVE ANTENNA ARRAYS FOR FREQUENCY HOPPED SYSTEMS

[75] Inventor: Jeffrey G. Searle, Galmpton, Great Britain

[73] Assignee: STC PLC, London, England

[21] Appl. No.: 78,590

[22] Filed: Jul. 28, 1987

[51] Int. Cl.[4] .............................. G01S 3/16; G01S 3/28
[52] U.S. Cl. .......................................... 342/383; 375/1
[58] Field of Search ..................... 342/380, 383; 375/1

[56] References Cited

U.S. PATENT DOCUMENTS

| | | |
|---|---|---|
| 4,217,586 | 8/1980 | McGuffin . |
| 4,550,414 | 10/1985 | Guinon et al. ........................ 375/1 |
| 4,670,885 | 6/1987 | Parl et al. ............................... 375/1 |

*Primary Examiner*—Theodore M. Blum
*Attorney, Agent, or Firm*—Lee & Smith

[57] ABSTRACT

An adaptive antenna array arrangement for a receiver in a frequency hopped spread spectrum system. The arrangement includes an auxiliary local oscillator ($lo_a$) which is hopped sequentially and pseudo-randomly across the spread system independently of the main frequency hopped oscillator ($Lo_m$). The adaptive array processor (FUA, FM, PM) is digital, operates in an open loop configuration and evaluates the frequency bands during periods of time when the main oscillator is not operating in those bands. The processor derives null sterring weights for each band. The weights for each band are stored (WS) and subsequently used ($W_{In} - W_{Qn}$) when the main oscillator hops into the band and so cause the array of generate nulls directed towards sources of unwanted systems.

5 Claims, 1 Drawing Sheet

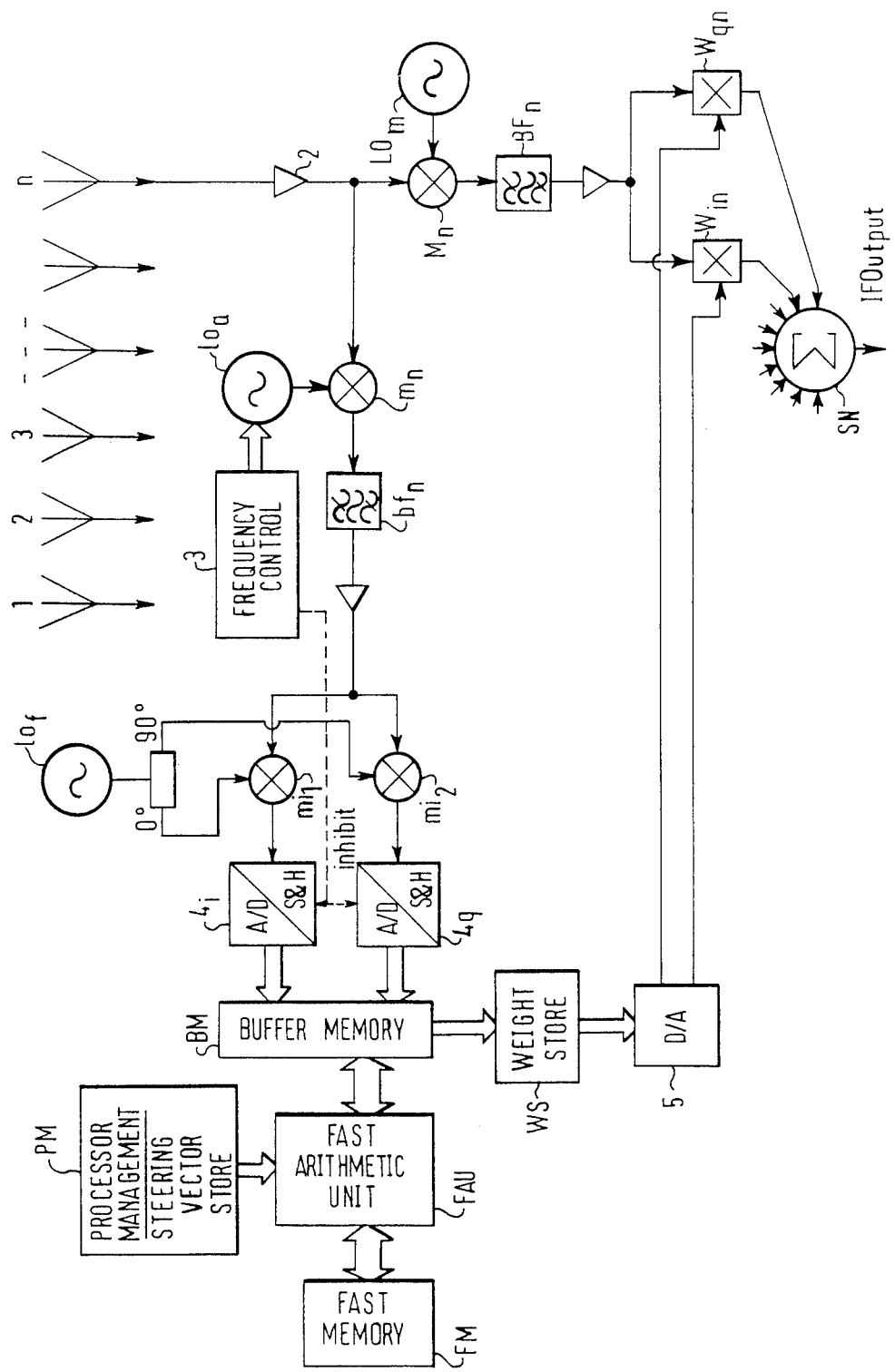

ADAPTIVE ANTENNA ARRAYS FOR FREQUENCY HOPPED SYSTEMS

This invention relates to adaptive antenna arrays applied to frequency hopped spread spectrum systems.

BACKGROUND OF THE INVENTION

Modern radar and communications systems must be designed to cope with directional interference, whether intentional or not, in order to satisfy the needs of the users. This requirement has led to increasing interest in adaptive antenna array techniques in recent years. "Adaptive Arrays and Sidelobe Cancellers; A Perspective" by D. J. Chapman, Microwave Journal, August 1977, presents a general view of this field of work. Another source of information on this subject is "Adaptive Arrays—An Introduction" by William F Gabriel, Proceedings of the IEEE, Vol. 64, No. 2, February 1976.

Another technique which has been developed is that of spread spectrum frequency hopping, such as is being used in the system known as JTIDS (Joint Tactical Information Distribution System) as described in "JTIDS: An Update" by Edward G. Smith, American Institute of Aeronautics and Astronautics, 1977. This technique is also discussed in "Spread Spectrum Systems" by Dixon, Wiley Interscience, 1966, p. 26 et seq.

SUMMARY OF INVENTION

According to the present invention there is provided an adaptive antenna array arrangement for a frequency hopped spread spectrum system receiver, the system including a main receiver and an auxiliary receiver arranged in parallel, the system being so arranged that, whilst the main receiver evaluates the frequency channel currently in use, the auxiliary receiver evaluates weight values whereby the adaptive array forms nulls in the reception pattern which nulls are directed towards unwanted signal sources.

According to the invention there is further provided an adaptive antenna array arrangement for a frequency hopped spread spectrum system receiver the arrangement including a frequency hopped auxiliary local oscillator and control therefor designed to hop sequentially and psuedo-randomly into frequency bands accross the spread spectrum of the system independently of the main receiver frequency hopped local oscillator which is hopped into the same bands on a different pseudo-random basis, individual means for mixing the output of the axuiliary local oscillator with the signal received from each of the antenna array elements, means for deriving from each mixing means weight values for each hopped frequency, means for storing the weight values so devived and means for applying the weight values to the relevant array element outputs when the main local oscillator is hopped into the different frequency bands, the weight values being such that the adaptive array forms nulls in the reception pattern which are directed towards unwanted signal sources. The system comprises main and auxiliary narrow band receivers in parallel. The main receiver evaluates the channel currently in use, while the auxiliary receiver evaluates the position of the spectrum being assessed for the production of suitable weights. By using the two receivers the need for a reference signal is obviated If the pseudo-random sequences of the main and auxiliary frequency hopped local oscillators are such that the main oscillator hops into the band currently being evaluated by the weight deriving means and the auxiliary occillator control may be arranged to inhibit the inputs to the weight deriving means during the time that the main oscillator is in that band. The system is intended for use for the reception of information from a frequency hopping transmitter. Such a transmitter generates pulses on a random or pseudo-random frequency hopping basis. Each pulse is moderated e.g. with digital information.

BRIEF DESCRIPTION OF THE DRAWING

An embodiment of the invention will now be described with reference to the accompanying drawings, which illustrates in schematic form an adaptive antenna array arrangement for a frequency hopping spread.

DESCRIPTION OF PREFERRED EMBODIMENT

In the arrangement illustrated the received signals from an array of antenna elements $1*n$ are each pre-amplified in amplifier 2 and fed via an individual main mixer $M_l$-$M_n$, main band pass filter $BF_l$-$BF_n$ and pair of weighting multipliers $W_{I1}$-$W_{IN}$, $W_{Q1}$-$W_{Qn}$ a common I.F. output summing network SN. (To simplify the drawing only the output from the nth element is shown). The mixers M are all fed from a main local oscillator $LO_m$ which is frequency hopped sequentially and pseudo-randomly across the spread spectrum band-with of the system. Each antenna element also feeds an individual auxiliary mixer $m_l$-$m_n$ and auxiliary bandpass filter $bf_1$-$bf_n$. The auxiliary mixers are all fed from an auxiliary frequency hopped oscillator $lo_a$ under the control of a control circuit 3. Control circuit 3 is advantageously used to control the hopping of both $LO_m$ and $lo_a$. The output of the auxiliary bandpass filter is then fed to two mixers $m_{il}$ and $m_{i2}$ where it is mixed in phase and in quadrature with the output from a fixed frequency local oscillator $lo_f$. The two quadrature outputs are then applied to individual sample-&-hold circuits and analogue-to-digital converters $4_i$ and $4_q$. The digital outputs from each element are fed into a common buffer BM from where they are transferred to a fast arithmetic unit FAU. Under the control of a combined processor management and steering vector store PM and unit FAU accesses a fast memory FM and derives null steering weights for each frequency band that the local oscillator $lo_a$ hops into. These weights are then transferred via the buffer memory BM to a common weight store WS. In due course when the main oscillator $LO_m$ hops into a frequency band the relevant weights are extracted from WS and, after digital-to-analogue conversion in individual converters 5, fed to the appropriate weighting multipliers $W_{In}$, $W_{Qn}$. The preformed method of computing the null steering weight is that known as a Sample Matrix Inversion (SMI), this being the method illustrated with reference to the accompanying drawings. The Systems is not however limited to this technique. For example, deepest descent techniques such as correlation or weight perturbation may also be used. The computational method involved in these techniques will be apparent to those skilled in the art. The system computes weight sets asynchronously and constantly updates the weight store WS.

The result of this is that the null steering weights are computed for each frequency band during those times when the desired signal is being transmitted in another frequency band, thus avoiding the difficult problem of reference signal generation and permitting the instantaneous bandwidth of the adaptive circuits to equal approximately that of the main receiver. The weight values are such that the adaptive array forms nulls in the reception pattern which nulls are directed towards unwanted signal sources.

To optimise the arrangement it is practicable for the hopping rate $lo_a$ to be much slower than that of $Lo_m$. Also the two pseudo-random sequences can be completely different both in order and duration. One result of this is that $Lo_m$ may hop into a band in which $lo_a$ is currently operating. Since this is obviously undesirable the control circuit 3 can be arranged to inhibit the operation of the A/D converters during the time that this condition occurs. If, for example, the main local oscillator hops once every 10*s whilst the auxiliary oscillator hops once every 100*s it can be seen that there is no serious degradation in the computation of the null steering weights. Thus, in expected jamming enviroments the arrangement described above can view the spectral region for which weights are being determined without any in-band filtering and consequent loss of visability. The time available for the adaptive array to evaluate the optimum weights for any band depends on the number of bands chosen, the time being significant changes in the external enviroment and the time loss due to the wanted signals lying in that band.

I claim:

1. An adaptive antenna array arrangement for a frequency hopped spread spectrum system receiver, the arrangement including a frequency hopped auxiliary local oscillator and control thereof designed to hop sequentially and pseudo-randomly into frequency bands across the spread spectrum of the system independently of the main receiver frequency hopped local oscillator which is hopped into the same bands on a different pseudo-random basis, individual mixing means for mixing output of the auxiliary local oscillator with the signal received from each of the antenna array elements, means for deriving from each mixing means weight values for each hopped frequency, means for storing the weight value so derived and means for applying the weight values to the relevant array element outputs when the main local oscillator is hopped into the different frequency bands, the weight value being such that the adaptive arrays form nulls in the reception pattern which are directed towards unwanted signal sources.

2. An arrangement according to claim 1 including means to inhibit the input in the adaptive array processor during the time that the main oscillator hops into a band currently being evaluated by the weight deriving means.

3. An arrangement according to claim 2 wherein the weight deriving means comprises a fixed frequency local oscillator, further mixing means for each antenna element arranged to mix the output of the individual mixing means in phase and quadrature with the fixed frequency local oscillator output, individual analogue-to-digital conversion means for the outputs of the further mixing means, and digital data processing means to which the digital outputs are applied.

4. An arrangement according to claim 2 wherein the weight deriving means comprises a fixed frequency local oscillator, further mixing means for each antenna element arranged to mix the output of the individual mixing means in phase and quadrature with the fixed frequency local oscillator output, individual analogue-to-digital conversion means for the outputs of the further mixing means, and digital data processing means to which the digital outputs are applied.

5. An adaptive antenna array arrangement for a frequency hopped spread spectrum system receiver, the arrangement including a main receiver and an auxiliary receiver arranged in parallel, the arrangement being that while the main receiver is frequency hopping into frequency bands of the spread spectrum system to evaluate the frequency band currently in use the auxiliary is frequency hopping into different frequency bands independently of the main receiver, the auxiliary receiver evaluating weight values whereby the adaptive arrays form nulls in the reception pattern which nulls are directed towards unwanted signal sources for the main receiver.

* * * * *